United States Patent
Hobbs

[15] 3,693,835
[45] Sept. 26, 1972

[54] CONVEYOR
[72] Inventor: Oliver K. Hobbs, 120 Elm St., Suffolk, Va. 23434
[22] Filed: July 16, 1971
[21] Appl. No.: 163,355

[52] U.S. Cl. .....................222/55, 214/17 B, 222/56
[51] Int. Cl. ................................................B67d 5/08
[58] Field of Search.....214/17 B; 222/52, 55, 56, 57, 222/59

[56] References Cited

UNITED STATES PATENTS

| | | |
|---|---|---|
| 1,657,037 | 1/1928 | Ripley ........................222/56 |
| 3,037,668 | 6/1962 | Jarrell.........................222/56 |
| 3,185,346 | 5/1965 | Loveall et al................222/55 |

Primary Examiner—Robert B. Reeves
Assistant Examiner—L. Martin
Attorney—Clelle W. Upchurch

[57] ABSTRACT

An apparatus is provided for distributing a comminuted material, especially tree bark, over a moving surface in a substantially uniform depth comprising a bin, drag bars which discharge the material from the bin and a ratchet assembly responsive to the depth of material on the moving surface for determining the rate at which the drag bars are moved.

10 Claims, 13 Drawing Figures

FIG. 1

INVENTOR
OLIVER K. HOBBS

INVENTOR
OLIVER K. HOBBS

BY Clelle W. Upchurch
ATTORNEY

INVENTOR
OLIVER K. HOBBS

BY Clelle W. Upchurch
ATTORNEY

FIG. 9

INVENTOR
OLIVER K. HOBBS
BY Clelle W. Upchurch
ATTORNEY

CONVEYOR

This invention relates generally to conveyors and more particularly to an apparatus adapted to distribute particles, granules, chunks, lumps, fragments, shreds or the like of a material over a surface at a substantially uniform depth.

It is frequently desirable to convey a comminuted material such as tree bark, or a granular material such as gravel or mixtures of clay, sand or the like continuously over the ground or into an apparatus where it may be spread over a surface, further comminuted, treated with chemicals, bagged or otherwise processed. Often, it is also desirable to bend or mix the material to improve the uniformity of its composition or size distribution before it passes into one of the aforesaid apparatuses.

It is therefore an object of this invention to provide an apparatus for distributing particles, granules, chunks, lumps, fragments, shreds or the like over a surface at a substantially uniform depth. Another object of the invention is to provide an apparatus adapted to spread one of the foregoing flowable materials substantially uniformly over a surface and which is further adapted to blend or mix the material to improve its uniformity of size distribution and composition before it is transferred to the surface. A more specific object of the invention is to provide an apparatus which is especially well suited for mixing and spreading comminuted tree bark over the ground or over a moving surface such as a continuous conveyor in a layer of substantially uniform depth.

Other objects will become apparent from the following description with reference to the accompanying drawing in which.

Figure 1:
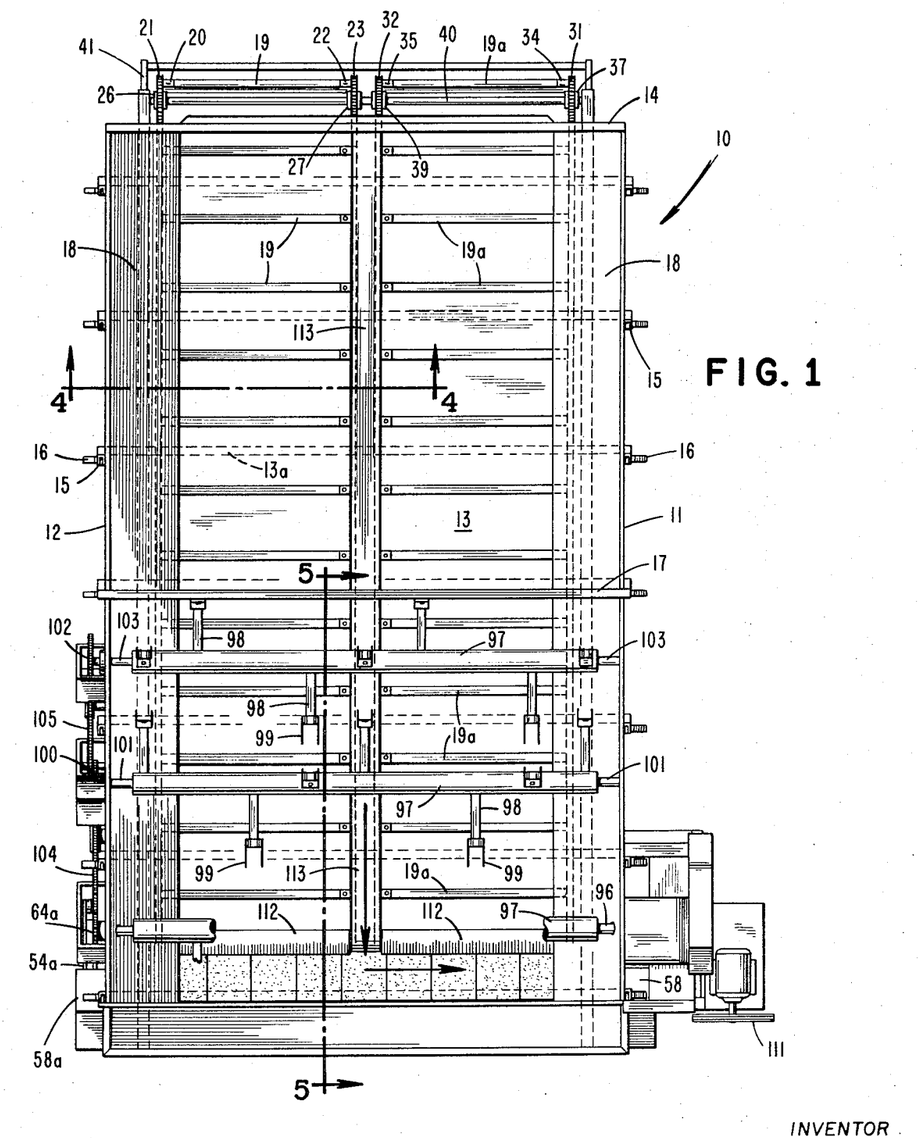
FIG. 1 is a plan view of one embodiment of the invention.
Figure 2:
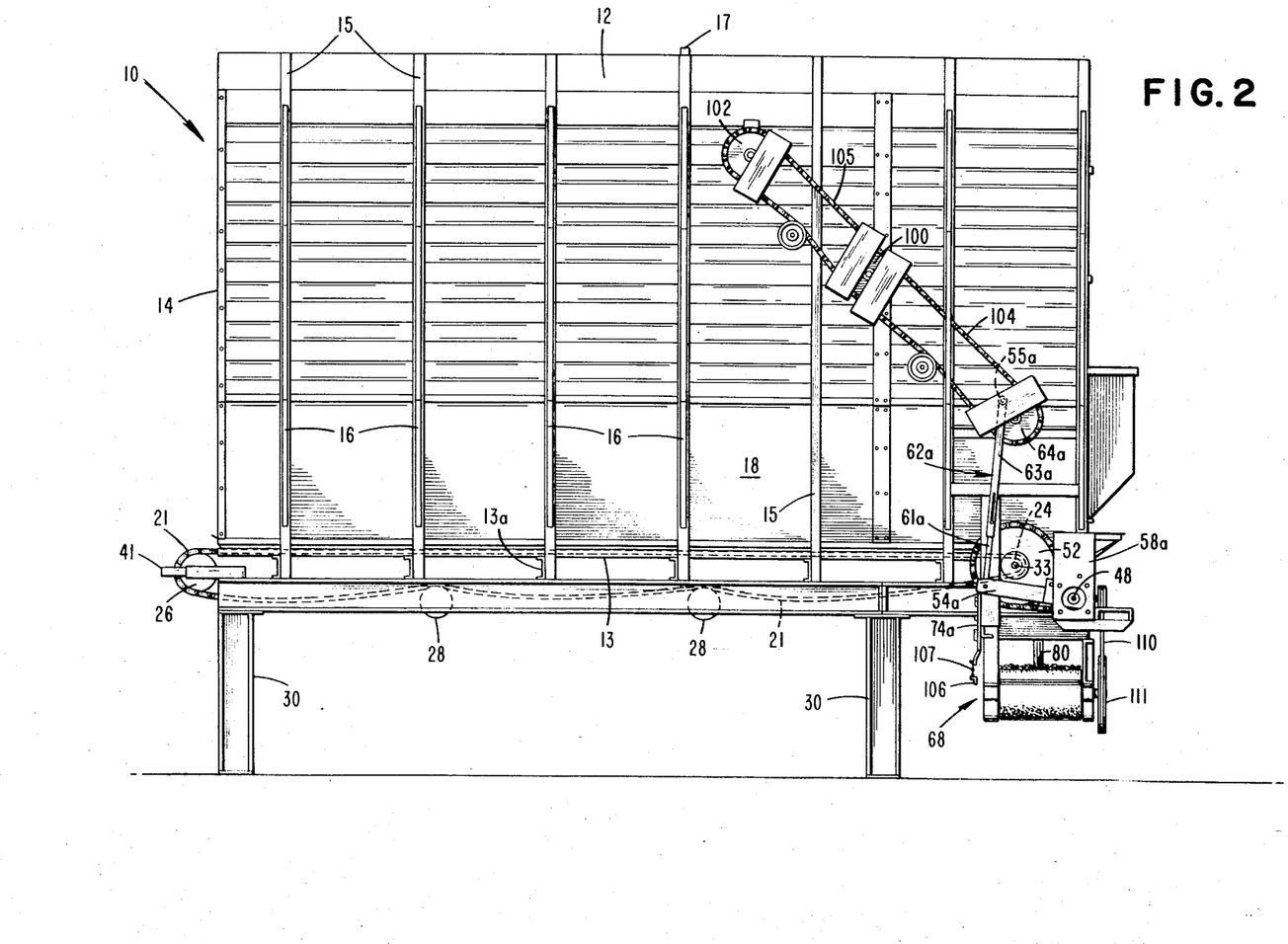
FIG. 2 is a side elevation looking from left to right of FIG. 1.
Figure 3:
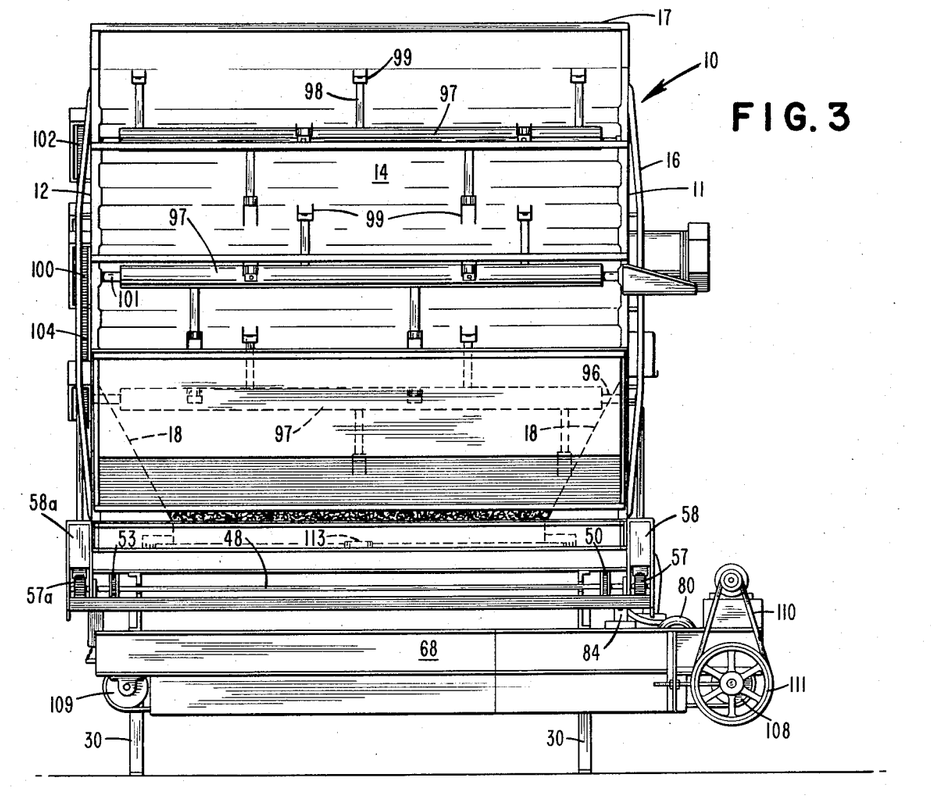
FIG. 3 is a front elevation of the embodiment of FIG. 1.
Figure 4:
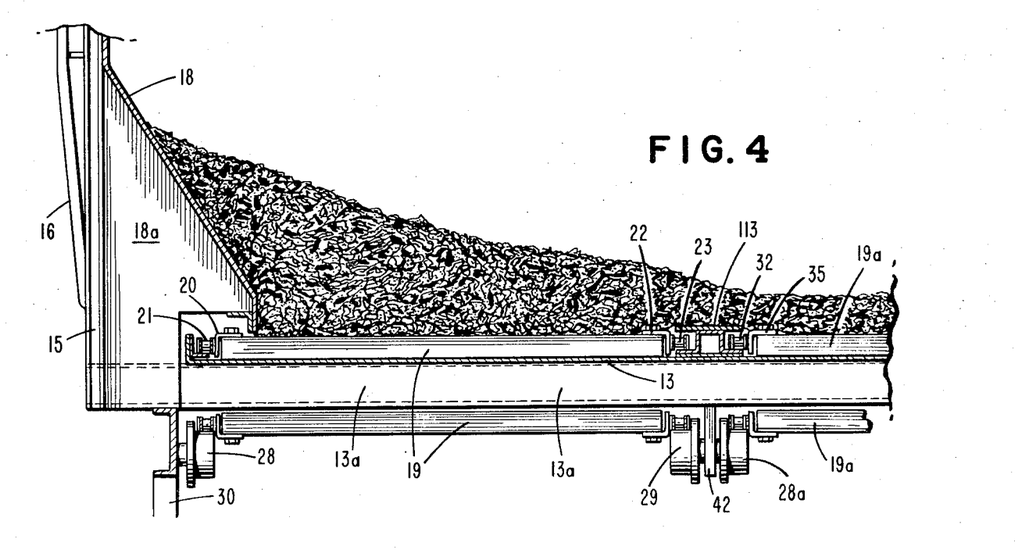
FIG. 4 is a fragmentary section taken approximately along the line 4—4 of FIG. 1.
Figure 5:
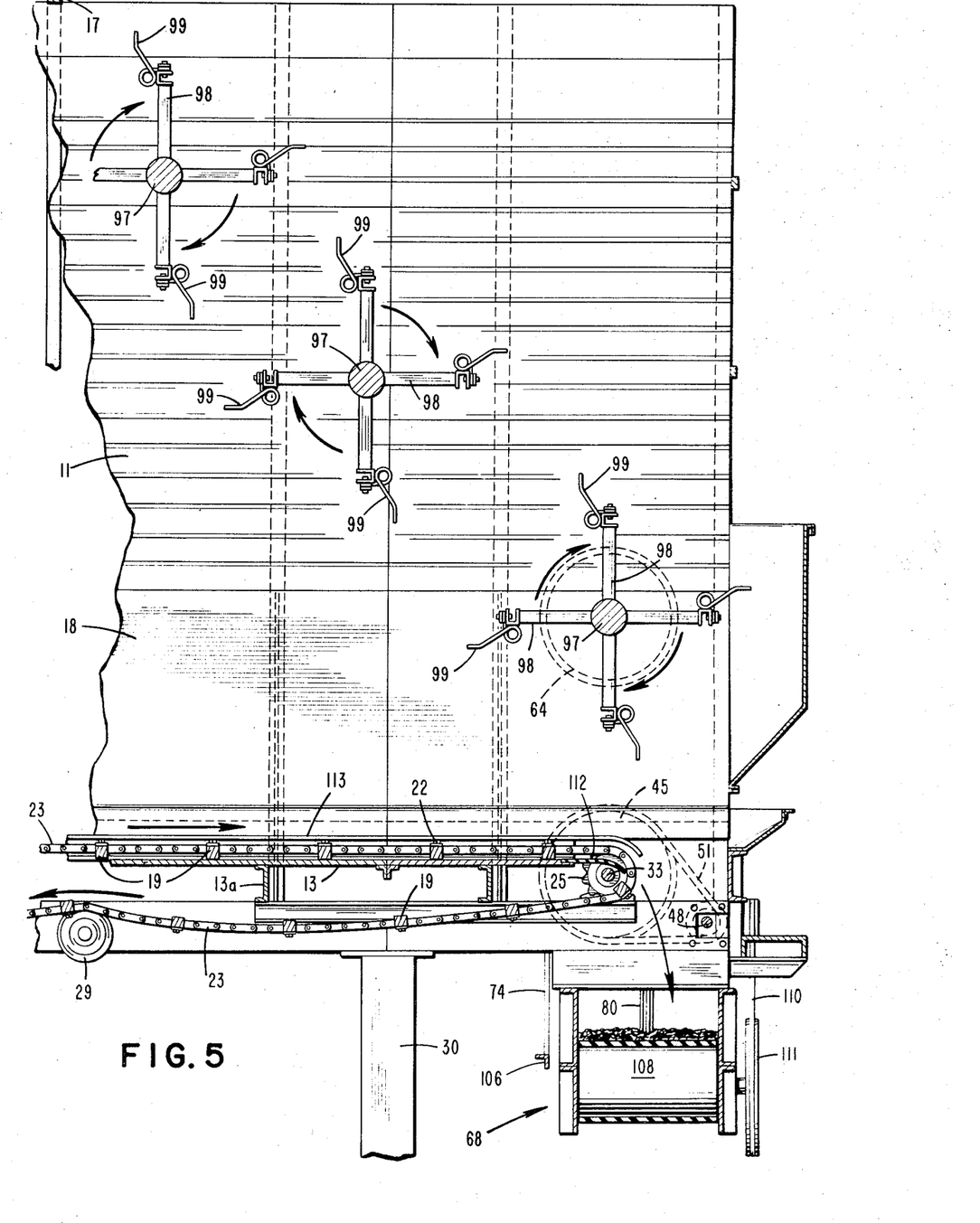
FIG. 5 is a fragmentary longitudinal section taken along the line 5—5 of FIG. 1.

Referring now to the drawing, and particularly to FIGS. 1, 2, and 3, a bin 10 has sidewalls 11 and 12, floor or bottom 13 supported by channel members 13a and rear panel 14. Sidewalls 11 and 12 and rear panel 14 are supported by spaced channel members 15. The walls are strengthened with angular braces 16 mounted on members 15 (FIGS. 3 and 4) and with top cross brace 17 shown best in FIGS. 1 and 3. Each of the side walls 11 and 12 and rear wall 14 slopes inwardly at its lower end (FIG. 4). The sloping portions 18 are supported by members 18a rigidly secured to channel members 15 and the sloping wall 18. A leg 30 at each corner supports bin 10.

A plurality of drag bars 19 are bolted or similarly fastened at one end to brackets 20 which are rigidly secured to sprocket chain 21 (FIG. 13) and at the other end to brackets 22 which are rigidly secured to sprocket chain 23. As illustrated best in FIGS. 1 and 12, bars 19 are spaced longitudinally along chains 21 and 23 which are looped at one end around sprocket wheels 24 and 25 and about idler wheels 26 and 27 at the other end, respectively. The return portions of sprocket chains 21 and 23 are supported by longitudinally spaced idler wheels 28 and 29, respectively, below floor 13 (FIG. 4). In this preferred embodiment, drag bars 19 span only about one-half of the width of floor 13. A second pair of sprocket chains 31 along sidewall 11 and chain 32 carry longitudinally spaced drag bars 19a rigidly secured thereon by brackets 34 and 35, respectively. Sprocket chain 31 is looped about sprocket wheel 36 and idler wheel 37. Sprocket chain 32 is looped about sprocket wheel 38 and about idler wheel 39. Chains 31 and 32 form loops about idlers 28a and 29a under floor 13 similar to idlers 28 and 29 of sprocket chains 21 and 23. Idler rollers 26, 27, 37, and 39 are journaled to rotate about shaft 40. The ends of shaft 40 are rigidly secured against rotation in adjustment arms 41 which provide for tension on the chains. Idler rollers 28, 29, 28a, and 29a are provided with bearings and are rotatably on channel 42 (FIG. 4).

Sprocket wheels 24, 25, 36 and 38 are spaced transversely from each other and are rigidly secured to shaft 33 (FIG. 12) which extends through bearings rigidly secured in sidewalls 11 and 12. Sprocket chains 21 and 31 are disposed under the edge of the sloping portions 18 of the sidewalls 11 and 12 to prevent material in the bin from reaching them. A guard 113 extends longitudinally over floor 13 and lies over and protects chains 23 and 32.

Figures 7, 8:
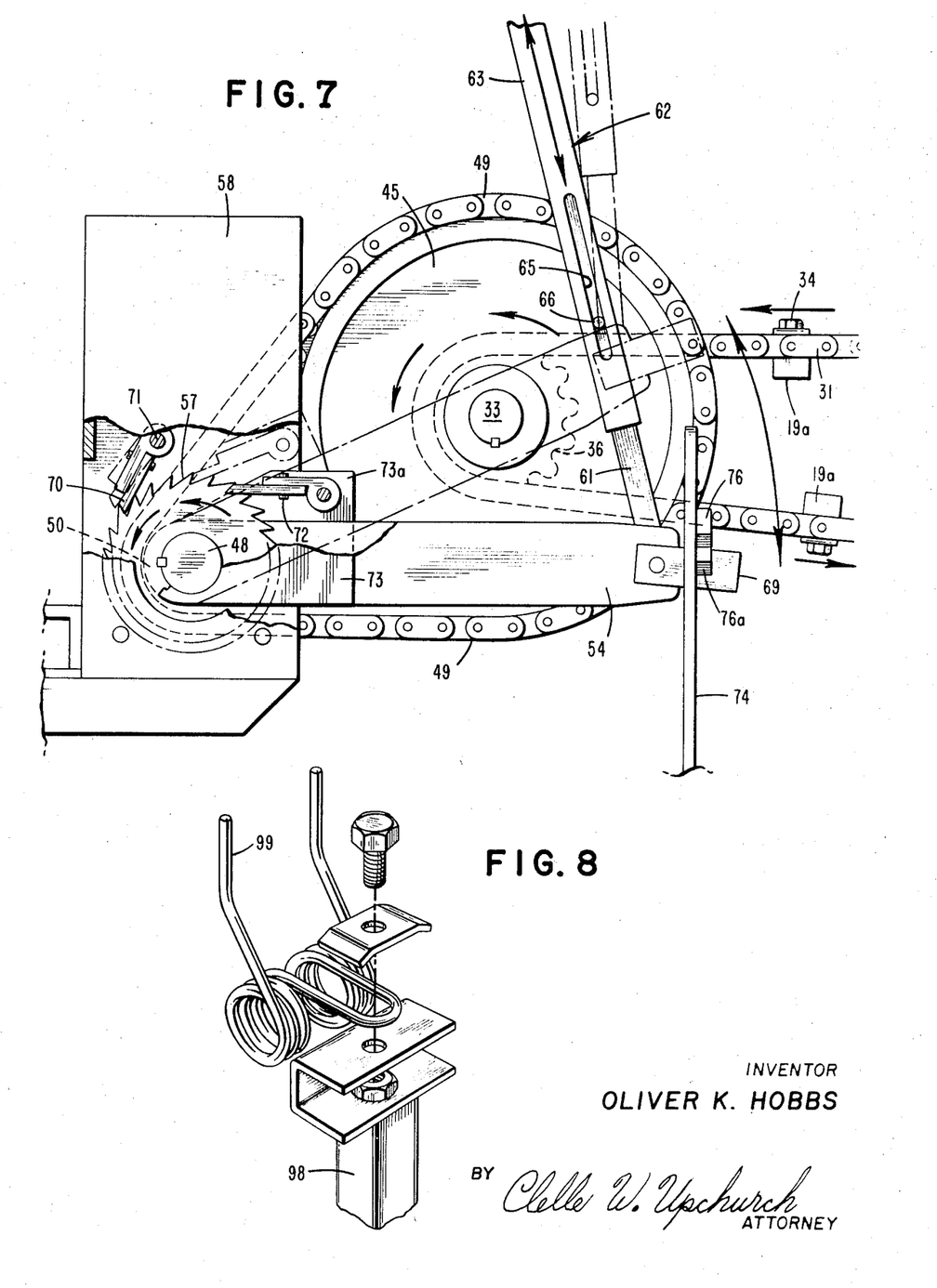
FIG. 7 is a schematic view illustrating a ratchet and drive assembly of the embodiment of FIG. 1.
FIG. 8 is an exploded perspective of the end of the agitators of one embodiment of the invention.
Figures 12, 13:
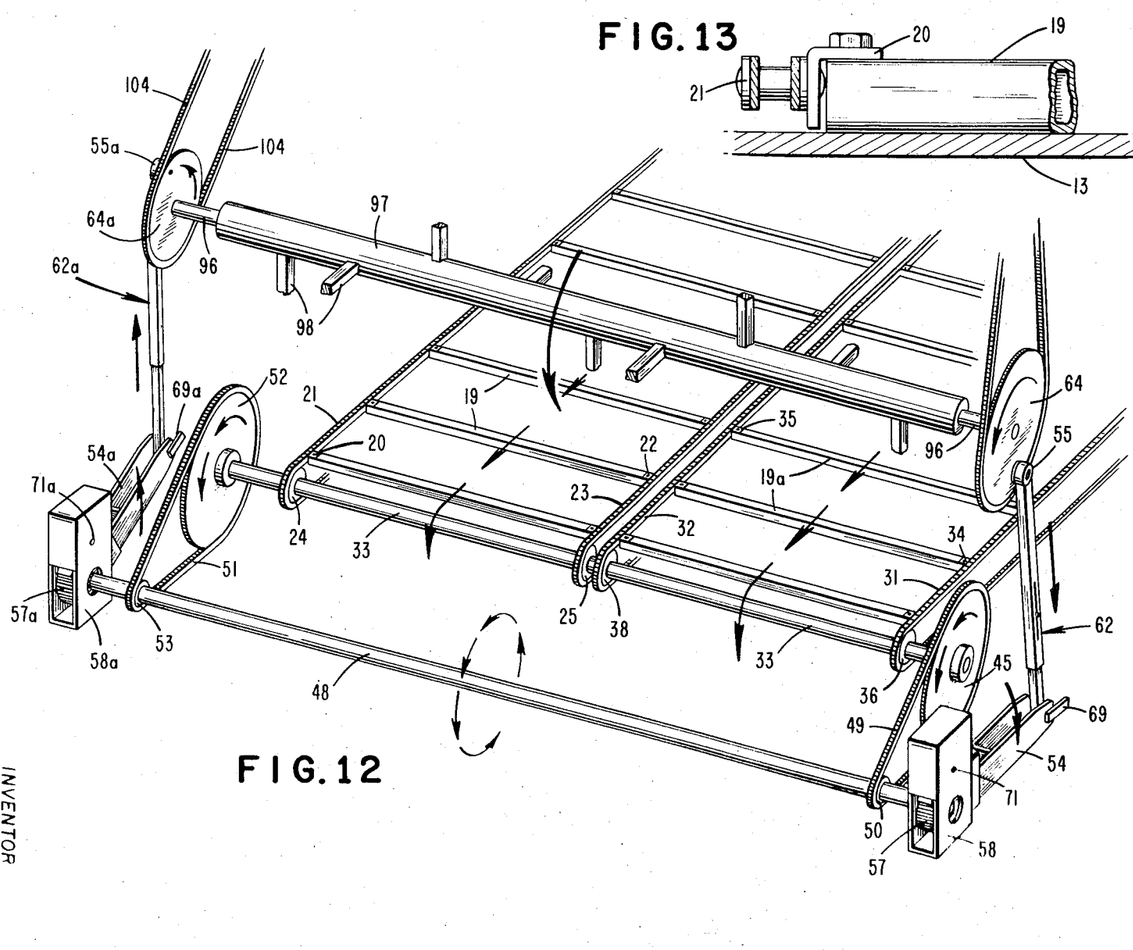
FIG. 12 is a pictorial representation of the drive mechanism.
FIG. 13 is a fragmentary view of one end of the chain and drag bar assembly.

Referring now to FIGS. 3, 7, and 12, shaft 48 extends transversely across the front of bin 10 substantially parallel to and spaced longitudinally in front of shaft 33. Shaft 48 extends through bearings rigidly secured in housings 58 and 58a. A sprocket chain 49 is looped about sprocket wheel 45 rigidly secured to shaft 33 and about sprocket wheel 50 which is rigidly secured to shaft 48. Sprocket wheels 45 and 50 are aligned with each other. Similarly, sprocket chain 51 is looped about sprocket wheel 52 which is rigidly secured to shaft 33 and about sprocket wheel 53 rigidly secured to shaft 48. Sprocket wheels 45 and 52 are adjacent the external surfaces of walls 11 and 12, respectively.

Figure 6:
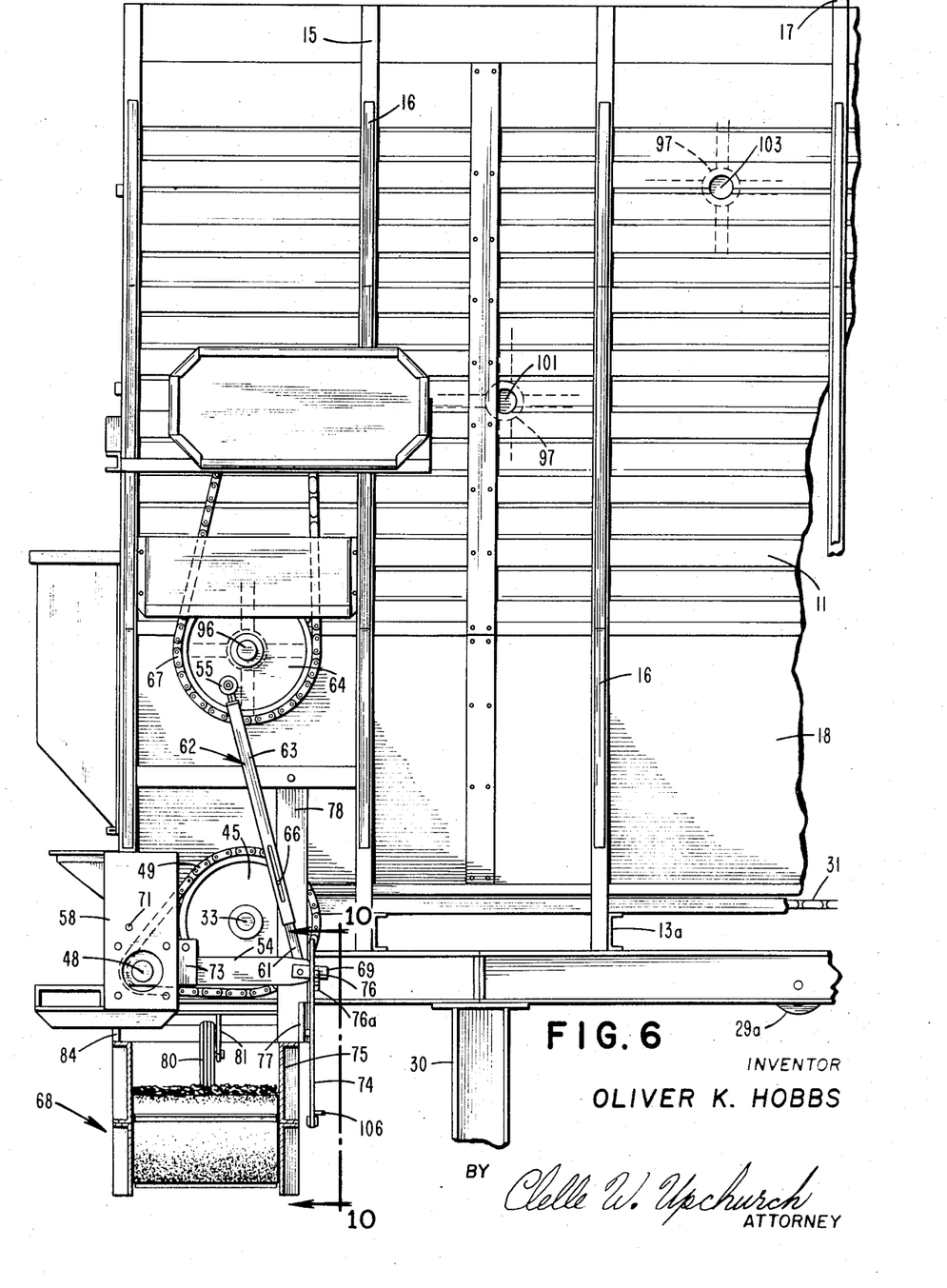
FIG. 6 is a fragmentary side elevation looking from right to left of FIG. 1.

A ratchet wheel 57 is rigidly secured to shaft 48 and is enclosed in housing 58. Bars 59 and 59a are rigidly secured together by cross-bar 60 to form arm 54 which is loosely held at one end about shaft 48 where it straddles ratchet wheel 57. Upper pawl 70 is rigidly secured to pin 71 which is pivotally mounted in openings positioned in housing 58 so the end of pawl 70 pressed forwardly against the teeth of ratchet wheel 57 and prevents wheel 57 from rotating counter clockwise. A second pawl 72 is pivotally mounted in openings in vertical arms 73 and 73a which are rigidly secured to arm 54. The opposite end of arm 54 is pivotally secured to the lower end of the male member 61 of a drive ratchet arm 62. The female member 63 of arm 62 telescopes over member 61 and has its upper end pivotally secured by a ball 55 to sprocket wheel 64 in a position spaced from the center of wheel 64 (FIGS. 6 and 12). Sprocket wheel 64 is rigidly secured to a shaft 96. Dog 69 extends outwardly from the end of arm 54 and is rigidly secured to arm 54. Pin 66 is rigidly secured to member 61 and extends through a slot 65 in member 63. Slot 65 is slightly longer than the maximum stroke of pin 66 as sprocket wheel 64 rotates. Sprocket wheel 64 is adjacent wall 11 and is rotated by chain 67 which is driven by a suitable electric motor from above.

As illustrated in FIG. 3, a continuous conveyor belt 68 extends transversely across the front end of bin 10 under the forward end of floor 13. Conveyor 68 may span the distance between sidewalls 11 and 12 and extend beyond to carry product to a hammer mill or some other apparatus. Alternately, conveyor 68 may terminate at one end near the center of floor 13 and a second conveyor similar to 68 may extend from the center of floor 13 in the opposite direction and carry product to a second hammer mill or the like.

Figures 10, 11:
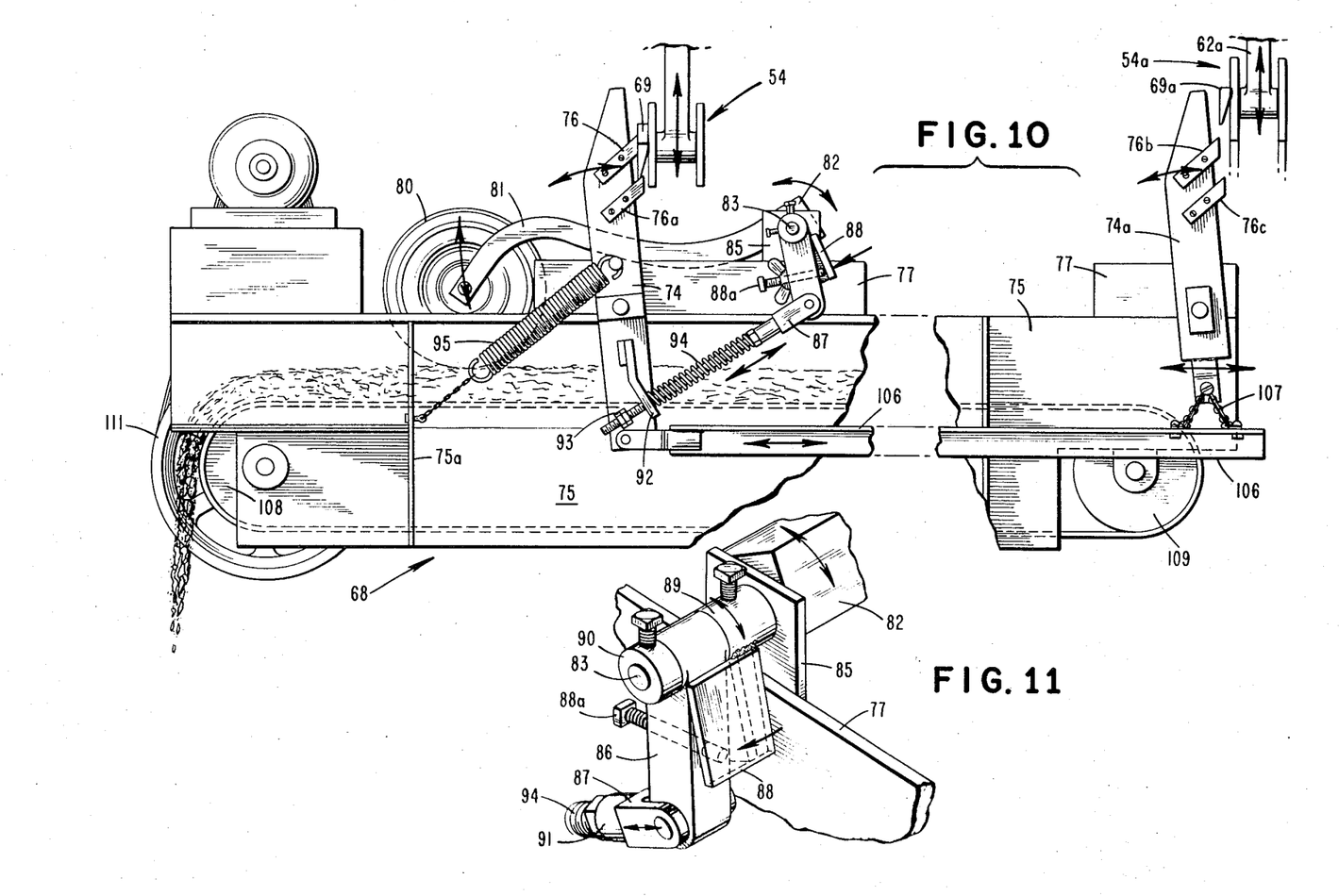
FIG. 10 is a side elevation of both ends of the cross-conveyor taken along the line 10—10 of FIG. 6.
FIG. 11 is a perspective view of the stroke adjustment means and the gauge wheel.

As illustrated in FIGS. 6 and 10, arm 74 is pivotally secured at its lower end to panel 77 which rests on wall 75 of the cross-conveyor 68. Arm 74 has a frusto right triangular shaped top portion which extends above panel 77. Dogs 76 and 76a are rigidly secured one over the other to arm 74 and extend outwardly therefrom towards drive ratchet arm 62. The length of dog 76 is such that it will stop dog 69 as drive ratchet arm 62 moves downwardly when arm 74 is substantially perpendicular to panel 77.

Figure 9:
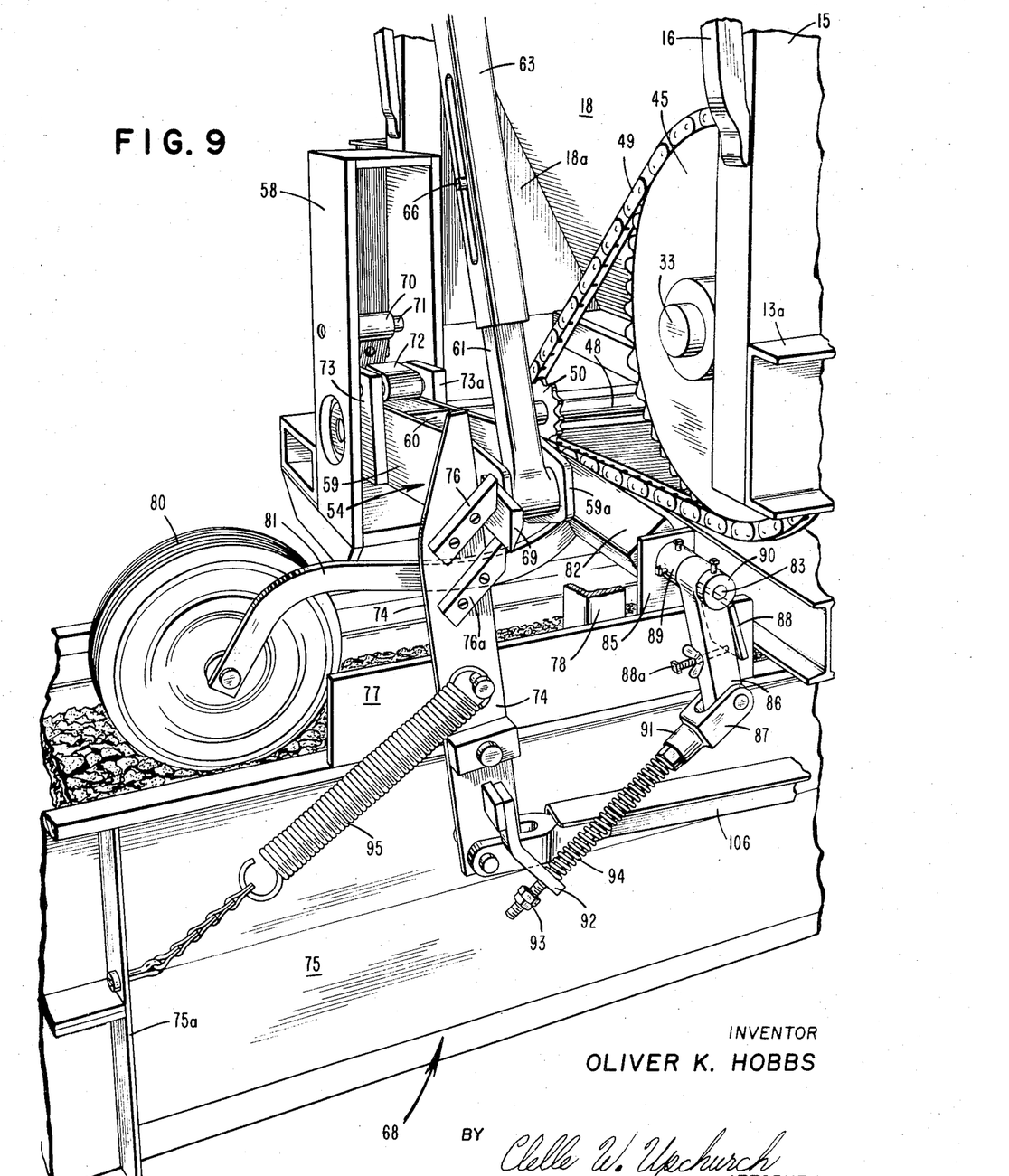
FIG. 9 is a perspective view of the assembly of FIG. 7.

Gauge wheel 80 is disposed over conveyor belt 68 and is journaled for rotation to one end of lever arm 81 which is rigidly secured at its other end to cross-bar 82. Cross bar 82 is rigidly secured to shaft 83 which is pivotally mounted in front bracket 84 and extends through a bearing in back bracket 85. An arm 86 is integral with a collar which fits loosely about shaft 83 and is secured at its lower end to clevis or yoke 87. A plate 88 is rigidly secured at one end to a collar 89 which is rigidly secured about shaft 83 between arm 86 and bracket 85. Collar 90 fits over the end of shaft 83 and holds arm 86 on the shaft. The angle at which arm 86 extends downwardly from shaft 83 with respect to bar 82 is determined by positioning arm 86 with respect to bar plate 88 with a set screw 88a. Linkage rod 91 is threadably mounted at one end in clevis 87 and extends through an opening in the lower end of flat mounting 92 (FIG. 9) which is rigidly secured to and extends downwardly from arm 74. A nut 93 loosely secures rod 91 to mounting 92. A compression spring 94 fits about rod 91 and at one end against mounting 92 and at the other end against clevis 87. A second compression spring 95 extends from arm 74 to support 75a to pull arm 74 away from dog 69 when rod 91 is not pushing arm 74 into a position substantially perpendicular to bar 77.

Shaft 96 extends across bin 10 and extends through sidewalls 11 and 12. Shaft 96 carries a tubular member 97 rigidly secured thereto and spanning the distance between walls 11 and 12 (FIGS. 1 and 12). A plurality of bars 98 are rigidly secured at one end to member 97 and extend substantially perpendicularly therefrom. Preferably, as illustrated in FIG. 8, a torsion spring 99 is rigidly secured to the free end of each bar 98. The bars 98 are spaced tranversely from each other and are also spaced circumferentially about member 97. This assembly of member 97 with bars 98 and springs 99 acts as an agitator as it rotates with shaft 96 not only to blend the material in bin 10 but to break up agglomerates of the material.

A sprocket wheel 64a is rigidly secured to the end of shafts 96 which extend outwardly from a bearing in wall 12 (FIGS. 1, 2, and 12). A double sprocket wheel 100 is spaced upwardly and backwardly from sprocket wheel 64a. Double sprocket wheel 100 is rigidly secured to a shaft 101 extending through a bearing rigidly secured in an opening in wall 12, spans the distance between walls 11 and 12 and is journaled at its opposite end adjacent wall 11. A third sprocket wheel 102 is positioned upwardly and back of sprocket wheel 100. Sprocket wheel 102 is rigidly secured to a shaft 103 journaled in bearings in openings in sidewalls 11 and 12. As shown best in FIGS. 1 and 8, shafts 101 and 103 carry agitators composed of tubular members 97, bars 98 and torsion springs 99 similar to those described with respect to shaft 96. Sprocket chain 104 is looped about sprocket wheel 64a and one of the wheels of double sprocket wheel 100 and a sprocket chain 105 is looped about the second wheel of sprocket 100 and sprocket wheel 102 as shown in FIG. 2.

A second ratchet assembly may be attached to sprocket wheel 64a. It is not necessary to have a second gauge wheel. As illustrated to best advantage in FIGS. 2 and 10, a cross-bar 106 is rigidly secured with a bolt at one end to the lower part of arm 74 and at its other end through chain 107 to a similar arm 74a.

A drive ratchet arm 62a similar to 62 has a dog 69a adapted to rest on dogs 76b and 76c of arm 74a. The upper female member 63a which telescopes over male member 61a to form ratchet arm 62a is attached by means of a ball 55a to sprocket wheel 64a. Arm 62a is attached off-center on wheel 64a and is preferably positioned about 180° around shaft 96 from the position where arm 62 is attached to sprocket wheel 64. As will be explained later, with such positioning on sprocket wheels 64 and 64a, shaft 48 will be rotated alternately by the two ratchet assemblies. A ratchet wheel 57a is rigidly mounted on shaft 48 in a housing 58a. An arm 54a corresponds to the structure described with respect to arm 54 and carries a pawl 72a (not shown). A pawl 70a (not shown) is pivotally secured to housing 58a as described with respect to housing 58 and pawl 70. Chain 107 is attached at two points to bar 106 and at its apex to arm 74a to form a triangle. When bar 106 is moved by arm 74, its weight causes chain 107 to exert more pressure on one side of the triangle than the other causing arm 74a to move too. If gauge wheel 80 attempts to change the setting on arm 74 while arm 74a is engaged by dog 69a, bar 106 will move and one side of the chain triangle will become slack; and as soon as arm 74a becomes disengaged from dog 69a by movement of arm 62a upwardly, arm 74a will move to its new position.

Cross-conveyor belt 68 is preferably a continuous rubber or similar elastomeric belt having spaced protuberances or ribs on its surface to assist in moving material to be conveyed. Belt 68 is looped around a drive roller 108 and idler roller 109. Drive roller 108 is driven by an electric motor through chain 110 and sheave 111 mounted on the shaft of roller 108.

Shafts 33 and 48 extend transversely just below and in front of the front end of floor 13. A suitable fabric or elastomeric strip 112 may be rigidly secured along one edge to floor 13 and extend over shaft 33 to direct material carried forward by bars 19 and 19a to conveyor 68.

In operation, comminuted bark or pieces of other material to be conveyed on belt 68 are placed in bin 10. The motors driving roller 108 and sprocket wheel 64 are started. Conveyor 68 rotates about rollers 108 and 109 at a constant speed. Rotation of sprocket 64 causes sprocket wheels 100 and 102 and the agitator assemblies carried by shafts 96, 101, and 103 to rotate and stir the material in bin 10 to avoid bridging and to mix it substantially uniformly.

As sprocket wheel 64 rotates, that end of arm 62 attached thereto rotates eccentrically therewith and female member 63 alternately lifts and releases pin 66 and male member 61. Meanwhile gauge wheel 80 is being rotated by belt 68 or by material lying thereon. When gauge wheel 80 is touching belt 68, spring 94 does not press against mounting 92 with sufficient pressure to move mounting 92 until arm 74 is positioned substantially perpendicular to wall 75. Consequently, spring 95 which is attached above the pivot point on arm 74 pulls arm 74 back sufficiently that dog 69 will miss both dogs 76 and 76a as it is carried downwardly and ratchet arm 62 will travel to its lowest position. This maximum movement of arm 62 moves arm 54 until pawl 72 carried thereon engages the teeth of ratchet wheel 57 and rotates it along with shaft 48. Ratchet arm 62 is lifted with each revolution of sprocket wheel 64 to allow repositioning of arm 74. Rotation of ratchet wheel 57 rotates sprocket wheels 50 and 53 on shaft 48 and sprocket wheels 45 and 52 on shaft 33. Sprocket wheels 24, 25, 36, and 38 and chains 21, 23, 31, and 32 are also rotated. Bars 19 and 19a are carried forward and bark or other material is pushed over the end of floor 13 and drops to conveyor 68.

If, on the other hand, the depth of material on belt 68 is greater than desired and greater than the ratchet assembly has been adjusted to accept, lever arm 81 exerts a pressure against cross-bar 82 which rotates shaft 83 clockwise and causes arm 86 to push spring 94 against flat mounting member 92 until arm 74 is substantially perpendicular to wall 75. When arm 74 is substantially perpendicular, dog 69 is stopped by upper dog 76 and the strokes of arms 62 and of arm 54 are too short to rotate ratchet wheel 57.

By properly spacing dog 76a below dog 76 on arm 74 and properly positioning arm 86 with respect to arm 88, the apparatus can be adapted to detect some but less than the desired amount of material on belt 68. When the layer of material under gauge wheel 80 is less than desired, sufficient pressure will be exerted against mounting 92 to move arm 74 towards a perpendicular position where the lower dog 76a will stop dog 69 and pawl 72 will rotate ratchet wheel 57 less than the number of notches it is moved when arm 62 is permitted to take a full stroke downwardly.

An apparatus having the ratchet assembly attached to sprocket wheel 64a described above will move bars 19 and 19a forward twice as often as one having only the assembly attached to sprocket wheel 64. In other words the bars will be moved alternately the same distance by each of pawls 72 and 72a each revolution of sprocket wheel 64.

In order that the apparatus will rotate the ratchet wheel two notches per revolution of sprocket wheel 64 or four notches if it has a sprocket wheel 64a, the lengths of the ratchet arm 62 in its maximum extended position and of arm 54 may be adjusted so that arm 62 will move arm 54 which carries the lower pawl 72 about 10° below and about 10° above horizontal. The position of the lower pawl 72 on arm 54 is then selected so the movement of pawl 72 is sufficient to rotate the ratchet wheel 57 two notches. Of course the dimensions can be changed to provide for movement of the ratchet wheel 57 any other desired number of notches per revolution of sprocket wheel 64.

The load thrust on drag bars 19 when the apparatus is operated under loaded conditions is directed at an angle of about 30° above horizontal. Chain thrust is, however, horizontal and a comparatively large drag bar is desirable. It is advantageous to have the drag bars lie flat on the bottom or floor 13 of the bin but the sprocket chains 21, 23, 31, and 32 are preferably positioned above the floor to avoid excessive wear. As illustrated in FIG. 13, it is preferred to use a tubular bar 19 having a rectangular cross-section. Each end of the bar 19 is attached to a sprocket chain with an off-set chain connecting link. As shown with respect to chain 21 in FIG. 13, one portion of the connecting link 20 is bolted to the top of the drag bar 19. The other portion of the connecting link or bracket 20 extends downwardly alongside the end of the drag bar 19 to the point where it is fastened to a link of chain 21. Such an arrangement permits the bottom of the bar to lie flat on the surface of the floor 13 and places the center line of the chain above the center line of the bar thereby preventing the chain from dragging across the floor.

The agitator system provided by the invention stirs the material in bin 10 and tends to insure that the least flowable material will be moved forward by the drag bar along with the more flowable. This provides a more uniform mix to the conveyor.

Comminuted material may be placed in the bin by any suitable means. Usually, it is charged into the bin near the back. A tractor loader or any other suitable means may be used to place the material in the bin. The agitators are usually rotated clockwise in bin 10 but they may be rotated counter clockwise.

The apparatus provided by this invention is particularly advantageous for flowing tree bark over a moving continuous conveyor. However, it may be used for spreading and blending other material which occurs in particles, chunks, lamps, granules, shreds or the like. For example, conveyor assembly 68 may be removed and a chute placed in front of floor 13 which catches the bark as it is discharged from bin 10 and directs flow of the material over the surface of the ground as bin 10 is pulled thereover. With such an apparatus gauge wheel 80 is mounted over the chute. Moreover, the apparatus may be used to mix sand and clay or to bend topsoil and spread it over the surface of a moving continuous conveyor or over the ground as bin 10 is moved thereover.

Although the invention has been described in detail for the purpose of illustration, it is to be understood that such detail is solely for that purpose and that variations can be made therein by those skilled in the art without departing from the spirit and scope of the invention except to the extent that it may be limited by the claims.

I claim:

1. An apparatus adapted to spread a comminuted material over a surface in a layer of substantially uniform depth comprising a bin adapted to contain said material and having a floor, a conveyor positioned below an open end of said bin and adapted to move away from said open end, and means for moving the material through said open end at a controlled rate, comprising a pair of spaced sprocket chains each looped about a sprocket wheel rigidly secured to a first shaft which extends transversely across the open end adjacent said floor and an idler wheel adjacent the opposite end of the floor, a plurality of drag bars spanning said chains and rigidly secured thereto, means for rotating said sprocket wheels and thereby moving the drag bars towards said open end comprising a ratchet arm, means for moving the ratchet arm up and down, means for detecting variations in depth of material on said conveyor, means responsive to said detecting means for reducing the length of the downward stroke of the ratchet arm, and means driven by the ratchet arm for rotating said sprocket wheels in response to the length of the downward stroke of the ratchet arm.

2. The apparatus of claim 1 having a means for stirring aggregate in the bin.

3. The apparatus of claim 1 wherein said means for rotating the sprocket wheel comprises a second pair of sprocket wheels rigidly secured to the first shaft, a second shaft spaced longitudinally from and extending substantially parallel to the first shaft, a pair of sprocket wheels rigidly mounted on the second shaft and aligned with the second pair of sprocket wheels on the first shaft, a sprocket chain looped about the aligned sprocket wheels on the first and second shafts, a ratchet wheel rigidly secured to the second shaft and means for rotating said ratchet wheel comprising a sprocket wheel, means for rotating the sprocket wheel, a ratchet arm attached off-center to the last said sprocket wheel and rigidly secured adjacent its other end to a second arm which straddles the ratchet wheel and is loosely attached to the second shaft, a pawl carried by said second arm adapted to be urged against the teeth of said ratchet wheel and to rotate the ratchet wheel when the second arm is moved by the ratchet arm, the stroke of said ratchet arm when uninterrupted being great enough for the pawl to move the ratchet wheel, and means for determining the length of the movement of the pawl which comprises a gauge wheel rotatably secured to one end of a lever arm and positioned to be rotated by the said conveyor, a cross-bar attached to the other end of the lever arm, a shaft rigidly secured to the cross-bar, means for supporting the last said shaft, an arm rigidly secured to move with the last said shaft and depending downwardly therefrom, an arm pivotally mounted and normally substantially perpendicular to the said conveyor, means extending from below the pivot of said arm to said depending arm whereby movement of the depending arm towards the pivoting arm tends to move the pivoting arm to perpendicular, and means attached to the pivoting arm above the pivot point for moving the upper portion of the pivoting arm away from the depending arm and from perpendicular, means carried by said pivoting arm for intercepting the lower end of the ratchet arm short of its normal downward movement and short of the eccentric movement required to move the pawl and rotate the ratchet wheel when the pivoting arm is substantially perpendicular to the frame of the conveyor.

4. The apparatus of claim 3, wherein four sprocket chains carry two sets of bars which combine to span the bin bottom.

5. The apparatus of claim 4, wherein said sprocket wheel having the ratchet arm attached thereto is rigidly secured to one end of a shaft which spans the width of the bin, a second sprocket wheel is rigidly secured to the other end of the shaft, a second ratchet arm is attached off-center to the second sprocket wheel and is positioned about 180° around the wheel from the point where the first ratchet arm is attached to the first sprocket wheel, an arm is attached at one end to the lower end of the ratchet arm and straddles a second ratchet wheel rigidly secured to the same shaft as the first ratchet wheel, said arm attached to the ratchet arm carries a pawl which engages teeth of the second ratchet wheel and rotates the wheel as the arm is moved by the ratchet arm, a bar attached to the first said pivoting arm extends transversely across the apparatus to a similar second pivoting arm adapted to intercept downward movement of the second ratchet arm, and a chain rigidly secured at each end to the last said bar and at the middle to the pivoting arm, whereby said second pivoting arm is pivoted responsive to pivoting of the first arm.

6. The apparatus of claim 2 wherein the sprocket wheel to which the ratchet arm is attached is rigidly secured to one end of a shaft which spans the bin, a sprocket wheel is rigidly secured to the other end of the shaft, double sprocket wheels are rigidly secured to a shaft which spans the bin and is spaced longitudinally and vertically from the last said shaft, an upper sprocket wheel is rigidly secured to a shaft which spans the bin and is spaced vertically and longitudinally from the shaft carrying the double sprocket wheels, a sprocket chain is looped about each of the double sprocket wheels and one of the adjacent sprocket wheels, means is provided for rotating the sprocket wheel having the ratchet arm attached thereto, and each of the shafts carries agitators spaced along those portions thereof which extend across the bin.

7. The apparatus of claim 6 wherein the agitators comprise a tube encircling and rigidly secured to shafts, arms extending perpendicularly from and rigidly secured to the tubular member, and a torsion spring rigidly secured to the free end of each arm.

8. The apparatus of claim 3 wherein the sprocket wheel to which the ratchet arm is attached is rigidly secured to one end of a shaft which spans the bin, a sprocket wheel is rigidly secured to the other end of the shaft, double sprocket wheels are rigidly secured to a shaft which spans the bin spaced longitudinally and vertically from the last said shaft, an upper sprocket wheel is rigidly secured to a shaft which spans the bin and is spaced vertically and longitudinally from the shaft carrying the double sprocket wheels, a sprocket chain is looped about each of the double sprocket wheels and one of the adjacent sprocket wheels, means is provided for rotating the sprocket wheel having the ratchet arm attached thereto, and each of the shafts carries agitators spaced along those portions thereof which extend across the bin.

9. The apparatus of claim 8 wherein the agitators comprise a tube encircling and rigidly secured to each of the shafts which span the bin, arms extend perpendicularly from and are rigidly secured to the tubular member, and a torsion spring is rigidly secured to the free end of each arm.

10. The apparatus of claim 2 wherein the ends of the drag bars are attached to the adjacent sprocket chain with the center line of the chain above the center of the bar whereby the drag bar lies substantially flat on the floor of the bin and the chain is above the floor of the bin.

* * * * *